United States Patent

Cecchin et al.

[15] 3,644,677

[45] Feb. 22, 1972

[54] SIGNAL DEMODULATING SYSTEM

[72] Inventors: Gildo Cecchin, Niles; Francis H. Hilbert, River Grove, both of Ill.

[73] Assignee: Motorola, Inc., Franklin Park, Ill.

[22] Filed: Mar. 9, 1970

[21] Appl. No.: 17,429

[52] U.S. Cl. ..................179/15 AW, 178/5.4 CD, 178/6.7 A

[51] Int. Cl. ..........................................................H04j 3/06

[58] Field of Search ..........................178/5.4, 6.7 A, 5.4 CD; 179/15 AW, 15 AP, 15 BT, 15 MM, 15 A; 329/106

[56] References Cited

UNITED STATES PATENTS

| | | | |
|---|---|---|---|
| 3,162,838 | 12/1964 | Sauvanet | 179/15 A |
| 3,248,718 | 4/1966 | Uemura | 179/15 A |
| 3,459,885 | 8/1969 | Goldmark et al. | 178/5.2 |
| 3,489,853 | 1/1970 | Lang | 325/40 |
| 3,018,335 | 1/1962 | DeRosa | 179/15 BT |
| 2,696,523 | 12/1954 | Theile | 179/15 BT |

*Primary Examiner*—Kathleen H. Claffy
*Assistant Examiner*—David L. Stewart
*Attorney*—Mueller, Aichele & Rauner

[57] ABSTRACT

In an electronic video recording (EVR) system, the color information is encoded in the form of pulse width modulated rectangular pulses derived from the EVR scanning pattern, with the two color signals required being provided in an interleaved pattern by time division multiplex. The leading edge of each of the pulses conveys the necessary synchronizing information and the trailing edge is modulated to represent the saturation of the particular hue to which the pulse corresponds. A demodulator for recovering the color information reconstructs and inverts the color information signal which then is applied to a demodulator gate in the form of a differential amplifier controlled by delayed switching pulses synchronized with the information signal to alternately enable one or the other of the outputs of this gate. A circuit is provided for resetting the phase of the flip-flop controlling the switching of the demodulator gate at the beginning of each line if the phase of the input signal is not proper.

8 Claims, 2 Drawing Figures

Inventors
GILDO CECCHIN
FRANCIS H. HILBERT
BY
Mueller, Aichele & Rauner
ATTYS.

SIGNAL DEMODULATING SYSTEM

BACKGROUND OF THE INVENTION

Electronic video recording systems (EVR) for color transmission differ from the conventional television color transmissions systems of the type used in broadcasting, since the color and monochrome signals are transmitted separately in two different channels. Although this should make the transmission of two narrow bandwidth signals a simple process, there are problems associated with transmission in the channel available for the color information which are not normally encountered in television circuits. These problems include frequency modulation of the television signals by beam velocity variation of the flying spot scanner, low-frequency amplitude modulation caused by light variations in the optics of the scanning system, together with phototube noise and grain noise on the flying spot scanner tube, and noise caused by foreign matter on the film on which the color information is recorded.

As a consequence, a system using pulse width modulation and time division multiplex to convey the color saturation and hue information has been proposed. This system has a number of advantages since only two levels need to be recorded on the film, namely opaque and clear, so that an inexpensive film may be utilized and careful processing is not necessary. By using an on-off light transfer characteristic together with signal clipping on the chroma channel in the EVR player itself, the effects of grain noise, film imperfections, and phototube noise are reduced. In addition, color errors introduced by cross modulation of subcarriers in the optical transfer process are minimized, and critical light level control is not required.

By encoding the pulses so that either the leading edge or the trailing edge of each pulse occurs at a particular point in each of the time division pulse intervals, the edges thus positioned may be utilized to provide the necessary synchronizing information for operating a binary decoding circuit for separating the multiplexed color information signals. It has been found, however, that undesirable crosstalk due to the ringing disturbances in the pulse transitions causes the synchronizing edges or transitions to be fuzzy or inaccurate, resulting in difficulty in switching the decoding circuits at the true pulse transitions to recover the modulated information. Since this crosstalk can produce disturbances which are intolerable for the production of good color resolution, it is desirable to utilize a demodulation system for operation with pulse width modulated, time division multiplexed, EVR color signals which is free of such disturbances.

SUMMARY OF THE INVENTION

Accordingly, it is an object of this invention to provide an EVR color demodulator system of an improved type.

It is an additional object of this invention to reduce crosstalk interference in an EVR demodulator used to decode pulse width modulated, time division multiplexed, color signals.

It is another object of this invention to operate a switched demodulator gate in synchronism with pulse width modulated, time division multiplexed, color signals, reconstructed in the form of a sequence of pulse intervals each including current and no-current portions, by switching the demodulator gate only during the no-current portions in response to a synchronizing signal derived from the reconstructed pulse train.

In accordance with a preferred embodiment of this invention, a pulse width modulated, time division multiplexed signal representative of information on different channels is directed to different utilization circuits under the control of switching clock pulses produced in synchronism with the beginning of each modulated pulse interval in the input signal but delayed a predetermined amount from the beginning of each pulse interval. More specifically each of the time division multiplex pulse intervals conveying information is reconstructed in the form of two distinct portions, with the ratio of the lengths of these two portions being indicative of the information content. The switching of a demodulator switch supplied with the reconstructed signal then is controlled by switching pulses to cause switching from one output to another only during periods when a predetermined one of these portions is present.

DETAILED DESCRIPTION

Figure 1:
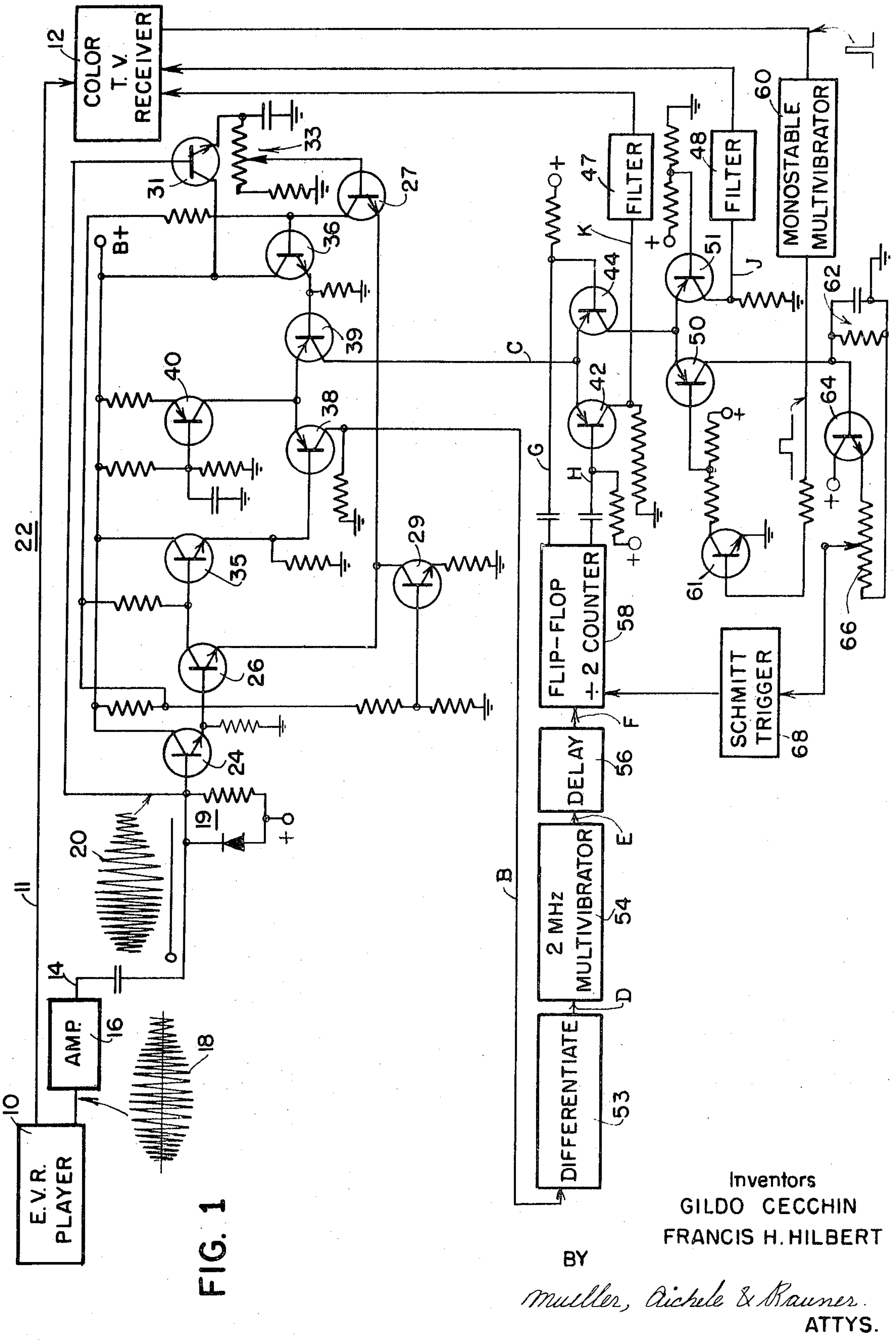
FIG. 1 is a schematic diagram, partially in block form, of a preferred embodiment of this invention.

Referring now to FIG. 1, there is shown an EVR player for reproducing color EVR signals in which the brightness information is supplied over one channel, represented by the lead 11 to a color television receiver 12; and the color information is supplied over another channel represented by the lead 14, to an amplifier 16. This color information is obtained from color signals recorded on the EVR film in the form of vertical, opaque stripes which are varied in width to provide the appropriate color information. When the frame is scanned in synchronism with the brightness or monochrome signal in a second separate corresponding frame, the color signal, in the form of width modulated rectangular pulses derived from the scanning pattern, is applied over the lead 14 to the amplifier 16. Since two color signals are required for a color television system, a time division multiplex of the two-color information is provided by recording the saturation information for different hues on alternate stripes of the film.

In order to provide recovery of synchronizing information to operate the demodulating or decoding system for separating this color information and supplying it to the television receiver 12, a positive-going transition is provided at the leading edge of each of the pulse intervals in the system shown in FIG. 1. Then a pulse of a predetermined minimum width occurring within a time division pulse interval may be utilized to represent a maximum negative color saturation for that pulse interval, whereas a pulse of a predetermined maximum width may be utilized to represent a maximum positive saturation of that color or hue for a given time division multiplex pulse interval. Of course, the trailing edges of the pulse intervals could be used for providing synchronizing information with the modulation being carried by the leading edges.

Figure 2:
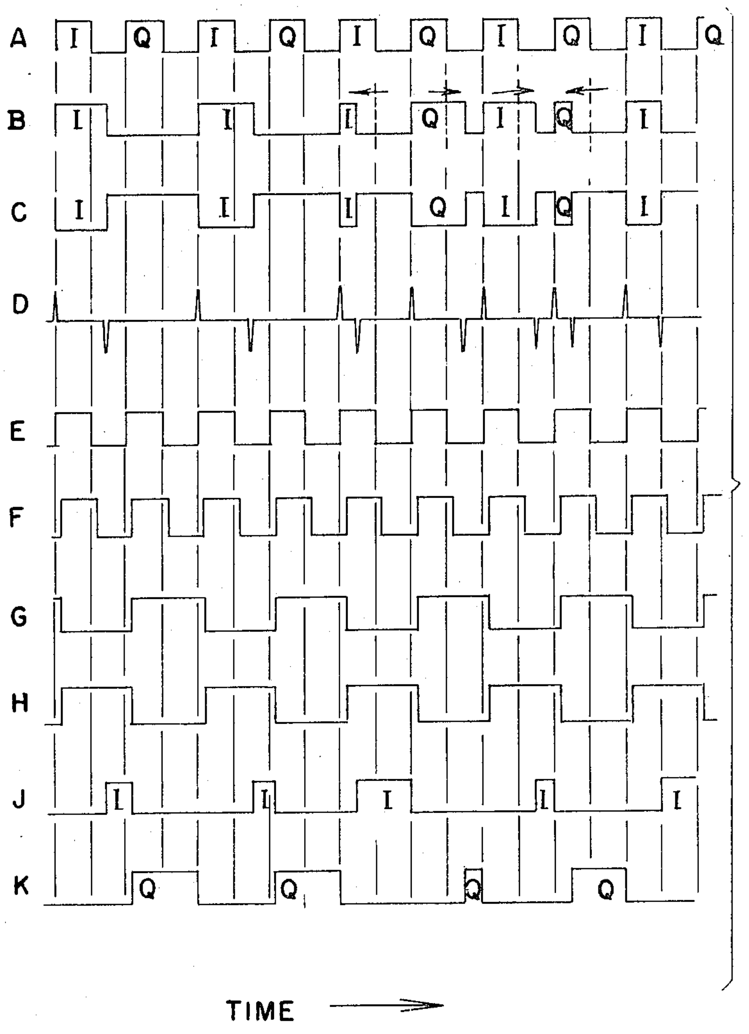
FIG. 2 illustrates waveforms useful in explaining the operation of the circuits shown in FIG. 1.

A pulse signal train comprised of signals of two hues (chosen, for example, to be the I and Q color axes) is shown in waveform A of FIG. 2. The pulse train of waveform A is formed as an interleaved series of 1 MHz. pulse trains which are combined by time division multiplex to form the composite chroma signal shown in waveform A. A nominal pulse width modulation representing zero saturation information midway between maximum negative saturation and maximum positive saturation is provided by a pulse width which is one-fourth of each 1 MHz. time interval. In waveform A, the multiplexed pulse trains both carry this amount of modulation; so that the composite signal is a 2 MHz. square wave signal.

Since the signals obtained from the phototube of the EVR player 10 are distorted by aperture limitations of the cathode ray tube and lense system, the waveform applied to the input of the amplifier 16 is not of the ideal form shown in curve A but is distorted similarly to the waveform 18 shown in FIG. 1.

The signal actually supplied over the lead 14 by the EVR player 10 is not a uniform signal of the type shown in waveform A, but resembles the signal shown in waveform B when the line synchronizing and color saturation modulation of the interleaved I and Q pulses exists. At the beginning of each line scanned by the flying spot scanner in the EVR player 10, the color information frame is modulated or encoded to provide phase synchronizing pulses for establishing the proper phase of operation of the decoding circuitry at the receiver. This phase information is obtained by fully modulating the I information pulses to their maximum width while at the same time preventing any Q information from appearing (or vice versa). This is indicated in waveform B by the first two I information pulses which are separated by a time division slot containing no information.

Following the transmission of a small number of these phasing synchronization pulses, the pulse width modulated time division multiplexed color information data is supplied. As stated previously, the modulated color information does not appear as the regular symmetrical square wave shown in waveform A of FIG. 2 but includes color information pulses ranging from a minimum width modulation to a maximum width modulation. Pulses carrying minimum width modulation are shown in waveform B as narrow pulses with left-pointing arrows above them, and pulses carrying maximum width modulation also indicated in waveform B by the pulses with the arrows pointing to the right located above them. Of course, in an actual signal, the pulse widths would range between these two extremes. Each information pulse is separated by a no-pulse interval, and the leading edge of each information pulse and the phase synchronization pulses all are precisely located to provide necessary synchronizing information. The modulation is on the trailing edge of the pulse supplied by the EVR player 10 over the lead 14.

The amplified signal 18 supplied from the output of the amplifier 16 is applied to a DC restoring circuit 19 which modifies the signal to appear as the signal 20. This restoration of the DC level is necessary in order to present the signal in proper form for regeneration by a signal reconstruction circuit 22 in the form of a dual cascaded differential amplifier, with the circuit 22 operating to regenerate the original pulse train as shown in waveform B as closely as possible.

The signal 20 is applied through an NPN emitter follower 24 to the base of an NPN-transistor 26 forming one-half of an input differential amplifier along with a second NPN-transistor 27. The emitters of the transistors 26 and 27 are coupled together to a constant current source provided by an NPN-transistor 29. The reference voltage for establishing the switching level of the differential amplifier 26 and 27 is obtained by applying the signal 20 to the base of an NPN emitter follower transistor 31, the emitter of which is coupled to a peak detecting circuit 33. The time constants of the peak detecting circuit 33 are chosen to provide an amplitude modulated reference voltage, the magnitude of which varies in accordance with the variations of signal strength of the signal obtained from the output of the amplifier 16. A portion of this amplitude modulated reference voltage is applied to the base of the transistor 27 through a potentiometer 28 to provide the reference level for controlling the operation of the differential amplifier 26 and 27.

It is apparent that when the instantaneous amplitude of the input signal 20 is greater than the reference voltage applied to the base of the transistor 27, the transistor 26 is rendered conductive and vice versa. By adjusting the tap of the potentiometer 28, the slicing level of the signal 20 may be varied to reconstruct the signal 20 into a square waveform of current and no-current intervals.

In order to sharpen the slope of the signal, obtained from the collectors of the transistors 26 and 27, the collectors of the transistors are cascaded through a pair of NPN emitter follower transistors 35 and 36, respectively, to the bases of an additional pair of PNP-transistors 38 and 39, connected as a second or output differential amplifier. The emitters of the transistors 38 and 39 are supplied from a constant current source in the form of a PNP0transistor 40 connected between the source of positive potential and the emitters.

The voltage swing controlled by the transistors 35 and 36 is much smaller than the voltage swing applied to the bases of the transistors 26 and 27 and results in a substantially sharpened waveform of current and no-current pulses at the collectors of the transistors 38 and 39. Since the transistors 26, 27, 35, 36, 38 and 39 are differentially connected in cascade, the tracking of the operation of the cascaded stages of the reconstruction circuit 22 is accurate with respect to the input signal obtained from the DC restoration circuit 19.

The reconstructed waveform obtained from the collector of the transistor 38 is the composite waveform B shown in FIG. 2, and the inverse of this waveform is obtained from the collector of the transistor 39 and is the composite waveform C shown in FIG. 2. This inverted waveform C is applied to an additional differential amplifier operated as a synchronous demodulator switch or steering gate and includes a pair of PNP-transistors 42 and 44, the composite signals being applied to the common-connected emitters of these transistors.

The amplifier switch 42, 44 is switched or operated in synchronism with the input signal to alternately gate the information carried by the current and no-current pulses within each time division multiplex pulse interval of the waveform C to a pair of low-pass filters 47 and 48, with the signals appearing on the collector of the transistor 42 corresponding to the demodulated Q color information signals and the signals appearing on the collector of the transistor 44 corresponding to the demodulated I color information signals. The signals on the collector of the transistor 44 are passed through a normally conductive PNP-transistor 51 of an additional differential amplifier switch including a second PNP-transistor 50; so that during the information carrying periods of the signal waveforms B and C, the demodulated color information is applied directly to the low-pass filters 48 and 49 to provide the demodulated I and Q color output signals. These output signals then are applied to the color TV receiver 12 and may be used directly to drive the cathode-ray tube in that receiver if it is capable of operation on I and Q signals; or if necessary, these I and Q signals may be recombined with a 3.58 MHz. reference signal at the proper phase for providing a composite chroma signal to be utilized in a television receiver for demodulating R, B, and G color information.

The reconstructed signal obtained from the collectors of either of the transistors 38 and 39 includes the necessary synchronization information for synchronizing the clock circuitry necessary to operate the demodulator switch 42, 44, since the negative to positive pulse transitions or leading edges of the pulses defining each of the pulse intervals in the waveform B (or the positive to negative pulse transitions of the waveform C) each occur at a predetermined fixed position relative to all other similar pulse transitions. To utilize this information to synchronize the operation of the demodulator switch, the waveform B obtained from the collector of the transistor 38 is applied through a differentiating circuit 53 which produces the waveform D shown in FIG. 2 at its output. The positive pulses of the waveform D applied to the input of a 2 MHz. free-running multivibrator 54 synchronize the phase of operation of the multivibrator 54 with the reconstructed composite signal. Waveform E of FIG. 2 illustrates the output pulses of the multivibrator 54, and it may be noted that these pulses occur at the 2 MHz. frequency illustrated in waveform A for a nominal or midpoint modulation of both the I and Q channels in synchronism with the signals shown in waveform A, B and C.

The 2 MHz. clock signal obtained from the output of the multivibrator 54 is supplied through a delay circuit 56 to produce the delayed clock pulse shown in waveform F of FIG. 2. The delay introduced in the clock pulses by the delay circuit 56 is approximately one-tenth of the time between the synchronizing pulse transitions of the I and Q modulated waveform as represented by the positive peaks of the waveform D in FIG. 2.

These delayed clock pulses then are applied to a divide-by-2 counter in the form of a complimentary flip-flop or bistable multivibrator 58, which provides a pair of complimentary square wave outputs, G and H (FIG. 2) applied to the bases of the demodulator switching transistors 44 and 42, respectively. The switching signals G and H occur at a 1 MHz. frequency and render the PNP-transistor to which they are applied conductive whenever they are low and nonconductive when they are high. Since these signals are the compliment of one another, one or the other of the transistors 44, 42 is always conducting to gate the input signals applied from the collector of the transistor 39 to the appropriate low-pass output filter 47 or 48.

Since the switching of the transistors 42 and 44 occurs at a frequency which is substantially one-half of the frequency of the modulated input signal, as most clearly seen in waveform A of FIG. 2, only the Q information present in the waveform C is applied to the low-pass filter 47, and only the I information present in the waveform C is applied to the low-pass filter 48. The information gated by the demodulator switch 42 and 44 operating on an input composite waveform, such as the waveform C of FIG. 2, is shown by the waveform J applied to the input of the filter 48 and the waveform K applied to the input of the filter 47.

It should be noted that in the pulse intervals where the input signal train shown in waveform B contains a signal with maximum width modulation, a minimum width output pulse is applied to the corresponding filter 47 or 48; and when the input signal of waveform B contains a pulse interval with minimum width modulation, a maximum width output pulse is applied to the input of the corresponding filter 47 or 48. By utilizing the inverted input signal (waveform C) as the reconstructed input to the demodulator switch, this inversion takes place; but since the color saturation information is contained by the ratio of no-current to current portions in each pulse interval, the inversion permits recovery of the same relative color values, but with a minimum width current pulse signal corresponding to a maximum positive saturation of the particular hue and vice versa. Of course the two different portions of each pulse interval also could be represented by two different current levels.

The reason for delaying the phase of the clock or switching pulses provided from the complimentary flip-flop 58 and for applying the inverted reconstructed signal train of current and no-current pulses as the input signal to the demodulator switch 42 and 44 is to cause the switching of the state of conduction of the transistors 42 and 44 to always occur when a no-current condition exists in the input signal applied to the emitters of the transistors 42 and 44. This is clearly illustrated by reference to waveforms C, G and H in FIG. 2, when it is noted that the transistors 42 and 44 are rendered conductive upon the positive-to-negative-going transition of the corresponding waveforms H and G applied to the bases of these transistors.

If switching of the conduction of the transistors 42 and 44 were done without inserting the delay provided by the circuit 56 and with the input signal to the emitters of the transistors 42 and 44 being obtained from the collector of the transistor 38 (waveform B), the information to be recovered would be contained in the positive pulse portions of the waveform B. To fully recover this information it would be necessary to cause the switching of the conduction of the transistors 42 and 44 to occur precisely in synchronism with the leading edge of the positive going pulse transitions shown in the waveform B. As stated previously, however, since the pulses used to drive the multivibrator 54, and ultimately the divide-by-2 counter 58, are derived from the positive-going transitions of this same pulse train, the synchronizing transitions are subject to undesirable crosstalk due to ringing disturbances. Thus, the phase of triggering of the divide-by-2 counter 58, also is subject to this crosstalk. The crosstalk on the signal used to switch the conduction of the transistors 42 and 44 has been found to result in inaccuracy or crosstalk in the recovery of the information amounting to as much as 20 or 30 percent of the reproduced output signals applied to the filters 47 and 48. This amount of crosstalk is intolerable for the production of good color resolution.

By using the inverted signal of waveform C as the input signal to the demodulator and by providing the delay in the switching or clock signal for controlling the switching of the demodulator transistors 42 and 44, crosstalk is almost completely eliminated. This is due to the fact that the transitions in the synchronizing signal used to drive the divide-by-2 counter 58, always occur during the non-information-carrying portions of the waveform C, with the conduction of the transistor 42 or 44 completely bridging the information carrying portions of the waveform C which is applied to the emitter thereof. This may be readily seen from an examination of the waveforms C, G and H with respect to the timing lines shown in FIG. 2. By offsetting the clock, pulse transitions from the leading edge of the information bearing portion of the signal, crosstalk disturbances in the clock pulse transitions have little or no affect on the demodulated output information.

It should be noted that a similar result could be obtained by utilizing the waveform B as the input signal to the demodulator switch 42, 44, but by advancing the waveforms G and H, which switch the transistors 42 and 44, by an amount equal to the delay introduced by the delay circuit 56 in the foregoing description. Such an advancement of the signal relative to the information of waveform B could be accomplished by introducing a substantially longer delay in the delay circuit 56, with the delay being just slightly less than the time required to complete one full cycle of the waveform E at the output of the multivibrator 54. This then would cause all of the switching transitions of the transitions of the transistors 42 and 44 to occur during the latter part of each of the time division multiplex pulse intervals, just preceding the leading or synchronizing edge of the pulse bearing the modulated information of the succeeding pulse for the other color information signal. The technique used in the embodiment shown in FIG. 1 however, requires a much shorter and less expensive delay circuit 56, so that it is more practical from an economic standpoint.

Similarly, a similar result could be obtained by inverting the outputs of the divide-by-2 counter by reversing the connections to the bases of the transistors 44 and applying the waveform B present on the collector of the transistor 38 through a delay circuit to the emitters of the transistors 42 and 44. Although the desirable switching at zero current levels of the input signal applied to the emitters of the transistors 42 and 44 could be obtained by the circuit modified in this manner, it still would be necessary to provide a relatively long delay of the information signal, resulting in increased expense over the circuit shown in FIG. 1.

It should be apparent that if the phase of switching of the demodulator switch transistors 42 and 44 is not in accordance with the phase of the received I and Q time division multiplexed information, the outputs of the demodulator switch 42, 44 would be reversed. The I color information then would be applied to the low-pass filter 47 for the Q channel and the Q color information would be applied to the low-pass filter 48 for the I channel. This situation obviously could not be tolerated.

In order to insure that the operation of the demodulator switch 42 and 44 is in a proper phase relationship with the signal obtained from the EVR player 10 and reconstructed by the circuit 22, the signal obtained from the player 10 at the beginning of each line of information includes the synchronizing pulses discussed previously in conjunction with waveform B. As described previously, these synchronizing pulses include fully modulated I portions alternating with no information during the time division intervals corresponding to the Q channel, with this sequence being repeated for four or five times. Thus, at the beginning of each line of received color information, it is possible to detect a proper phase relationship of the demodulator operation to the signal. To do this, the information present on the collector of the transistor 44 (the I channel information) is monitored during the time when these phase synchronizing pulses are present.

The horizontal flyback pulses from the color television receiver 12 is applied to a monostable multivibrator 60 which produces a 5-microsecond synchronizing gate pulse commencing with the trailing edge of the flyback pulse. This synchronizing gate pulse is applied to the base of an NPN-transistor 61 to render the transistor 61 conductive during the presence of the synchronizing gate pulses. When the transistor 61 conducts, the potential on the base of the transistor 50 drops to a level which is below the potential applied to the base of the transistor 51; causing the transistor 50 to conduct and the transistor 51 to be cut off. This causes the output of the transistor 44 to be diverted through the transistor 50 to a short time constant integrater circuit 62 connected to the base of an NPN emitter follower transistor 64.

The voltage on the emitter of the transistor 64 corresponds to the energy content of the pulses passed through the transistor 50 from the collector of the transistor 44 during the synchronizing gate interval. This voltage is applied across a potentiometer 66 to establish an adjustable threshold for a Schmitt trigger circuit 68. If the system is in proper phase syncronization, the initial portion of the waveform J shown in FIG. 2, with the low-energy content I pulses, is applied to the circuit 62, resulting in a relatively low potential present on the emitter of the transistor 64. This potential, as obtained from the tap on the potentiometer 66, is below the threshold or triggering level of the Schmitt trigger circuit 68 and has no effect on the operation of the circuit.

Upon termination of the synchronizing gate pulse applied to the base of the transistor 61, that transistor once again is rendered nonconductive, which in turn causes the transistor 50 to be rendered nonconductive and the transistor 51 to be rendered conductive. The signals present on the collector of the transistor 44 then are passed through the transistor 51 to the low-pass filter 48.

If the operation of the differential amplifier demodulator switch 42, 44 is out of phase (the switch is either in phase or 180° out of phase with the information signal train), the signal passed by the transistor 50 to the integrating circuit 62 during the presence of the synchronizing gate pulse is the signal waveform K instead of the waveform J. It can be seen that during the synchronizing interval the waveform K contains a high energy content of information compared to the waveform J, so that the potential present on the emitter of the transistor 64 is substantially higher than it is during when the system is in phase synchronization. This higher potential is sufficient to exceed the trigger level of the Schmitt trigger circuit 68, which thereupon produces an output pulse applied to the flip-flop 58 as an additional trigger pulse to change its state, placing the system back in phase. The operation of the circuit then continues in the manner previously described.

To be recognized as an additional trigger pulse at the flip-flop 58, it is important that the output pulse from the Schmitt trigger circuit not coincide with the synchronizing or driving pulses obtained from the delay circuit 56. This may be ensured by setting the threshold level of the Schmitt trigger 68 to occur somewhere at or just past the midpoint of the voltage ramp produced in the circuit 62 by an out-of-phase high energy content pulse (waveform K) during the synchronizing interval.

We claim:

1. A system for demodulating signals in the form of a sequence of pulse width modulated and time division multiplexed pulses, with successive pulses in the pulse sequence representing different channels of information and with the pulse width modulation corresponding to the information content, each pulse in the sequence including two distinct portions, the ratio of the lengths of these portions being representative of the information content for that pulse, the system including in combination:

means responsive to the signal sequence for channeling the pulses present in successive time intervals of the time division multiplexed signal sequence to different utilization circuits;

control means, responsive to the signal sequence and operated in synchronism with the signal transitions between adjacent ones of the time division multiplexed pulses of the signal to be demodulated, coupled with the channeling means for controlling the operation thereof to switch the channeling of the pulses from one utilization circuit to another only during a predetermined one of the portions of the pulses; and delay means coupled with at least one of said channeling means and said control means for introducing a relative delay between the transitions between successive pulses of the time division multiplexed pulse sequence and the switching of the channeling means by the control means.

2. A system for demodulating signals in the form of a sequence of pulse width modulated and time division multiplexed pulses with successive pulses in the pulse sequence representing different channels of information and with the pulse width modulation corresponding to the information content, including in combination:

means responsive to said signals for reconstructing the signal sequence into a sequence of successive time intervals each including first current and second current pulse portions, with the ratio of the first current to second current portions in each time interval being representative of the information content for that time interval;

means coupled with the reconstructing means for channeling the first channel pulse portions present in successive time intervals to different utilization circuits; and control means including delay circuit means responsive to the signal sequence, operated in synchronism with the signal transitions between adjacent ones of the time division multiplexed pulses of the signal to be demodulated, and coupled with the channeling means for controlling the operation thereof to switch the channeling of the first current pulse portions from one utilization circuit to another during the periods of second current pulse portions of the time intervals, the delay means introducing a relative delay between the transitions between successive pulses of the time division multiplexed pulse sequence and the switching of the channeling means.

3. The combination according to claim 2 wherein the demodulating system is a system for demodulating information signals in which alternate pulses of the time division multiplexed signal represent two different channels of information and wherein the pulse width modulation corresponds to the information represented by the modulated pulse and further wherein the channeling means is a differential steering gate having a common input and first and second outputs coupled to first and second utilization circuits corresponding to the two different channels of information.

4. The combination according to claim 3 wherein the control means includes a bistable circuit coupled to the steering gate and operated in synchronism with the delayed transitions between the time division multiplexed pulses to be demodulated.

5. A circuit for processing color input signals for use in a television receiver, the color signals being encoded as a sequence of time division multiplexed, pulse width modulated pulses, alternate pulses representing different ones of two hues modulated in width to represent the saturation of the particular hue represented by the pulse including in combination:

means responsive to the sequence of pulses for providing a composite signal in the form of a train of pulse intervals each having current and no-current portions with alternate pulse intervals corresponding to different ones of said two hues;

clock means providing clock pulses at a rate corresponding to the frequency of said pulse intervals;

means coupled with the clock means and responsive to said composite signal for synchronizing the operation of the clock means to cause said clock means to produce clock pulses delayed a predetermined amount from the beginning of each pulse interval;

demodulator switch means having an input and first and second outputs for switching signals applied to the input to one or the other of the outputs under the control of switching signals applied to the switch means;

means for applying the composite signal to input of the demodulator switch means; and means for applying the delayed clock pulses to the demodulator switch means as a switching signal to alternately switch the demodulator switch means between the first and second outputs at the frequency of the clock pulses, causing the composite signal applied to the demodulator switch to be alternately supplied to the first and second outputs, thereby separating the current pulses corresponding to the different hues.

6. The combination according to claim 5 wherein the synchronizing means includes a differentiating circuit producing a synchronizing pulse at the leading edge of each pulse interval of the composite signal for synchronizing the operation of the clock means with the composite signal and further includes delay circuit means for delaying said clock pulses by an amount sufficient to cause operation of the demodulator switch means to occur when the composite signal applied to the switch input is at a no-current portion of a pulse interval.

7. The combination according to claim 6 wherein the clock circuit means includes a free-running multivibrator and a bistable multivibrator driven from one stable state to another by the output of the free-running multivibrator with the synchronizing pulses being applied to the free-running multivibrator, the output of the bistable multivibrator constituting the switching signal for controlling the operation of the demodulator switch means.

8. The combination according to claim 7 where the demodulator switch means is a differential amplifier switch having first and second control inputs and wherein the bistable multivibrator provides first and second complimentary outputs coupled with the first and second control inputs, respectively, to differentially control the operation of the differential amplifier switch means.

* * * * *